C. F. BROWN.
LIQUID MEASURING APPARATUS.
APPLICATION FILED MAR. 17, 1914.

1,144,583. Patented June 29, 1915.

Witnesses
Chas. L. Griesbauer.
W. Wallace Nairn Jr.

Inventor
Charles F. Brown
By Sowell & Sowell
Attorneys

UNITED STATES PATENT OFFICE.

CHARLES F. BROWN, OF NEW YORK, N. Y., ASSIGNOR TO UNIVERSAL LIQUID REGISTER COMPANY, OF NEW YORK, N. Y., A CORPORATION OF NEW YORK.

LIQUID-MEASURING APPARATUS.

1,144,583.  Specification of Letters Patent.  Patented June 29, 1915.

Original application filed December 20, 1913, Serial No. 807,911. Divided and this application filed March 17, 1914. Serial No. 825,290.

*To all whom it may concern:*

Be it known that I, CHARLES F. BROWN, a citizen of the United States, residing at New York, in the county of New York and State of New York, have invented certain new and useful Improvements in Liquid-Measuring Apparatus; and I hereby declare that the following is a full, clear, and exact description thereof, reference being had to the accompanying drawings, which form part of this specification.

This invention is a novel apparatus for dispensing liquids, and is particularly designed for use in dispensing charged beverages such as beer.

The object of the invention is to enable the liquid contents of a vessel to be accurately measured as it is dispensed and to avoid loss or erroneous measure due to expansion or foaming of the liquid when relieved from pressure. The apparatus is to be interposed between the dispensing faucet and the original cask or container, and the liquid is passed through such apparatus as it is dispensed, and is accurately measured thereby and does not have an opportunity to foam or expand in passing from the original container to and through the measuring apparatus. The liquid is measured in stated quantities, and such quantities may be registered, so that by inspection of the register the owner of the apparatus can at once tell how much liquid has been dispensed; and he can by noting the register readings determine how much liquid has been supplied to him in the original container.

I will explain one practical form of the invention which will enable those skilled in the art to construct and use the same, and refer to the claims for a summary of the features and combinations of parts for which protection is desired; the apparatus however is susceptible of modification in form and arrangement as will be obvious when the invention is fully understood.

Figure 1:
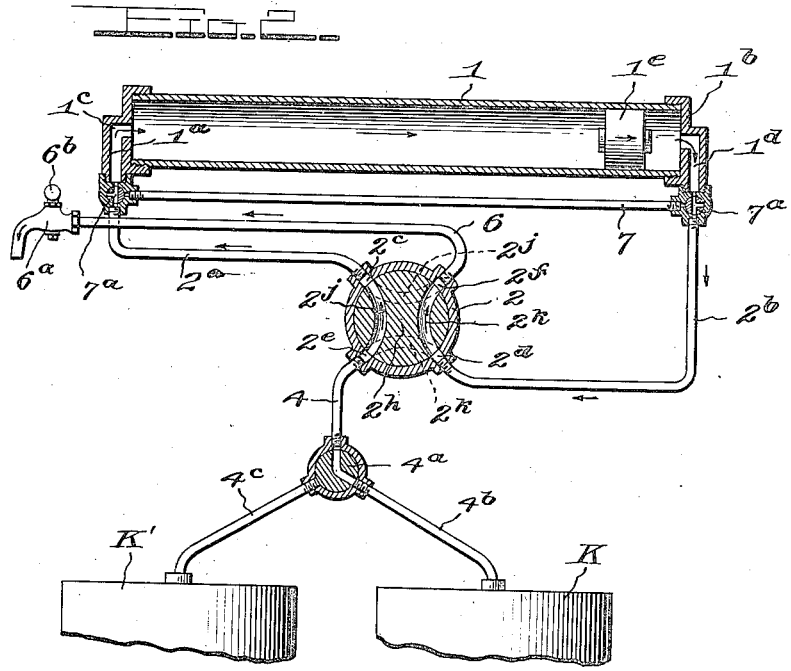
Figure 2:
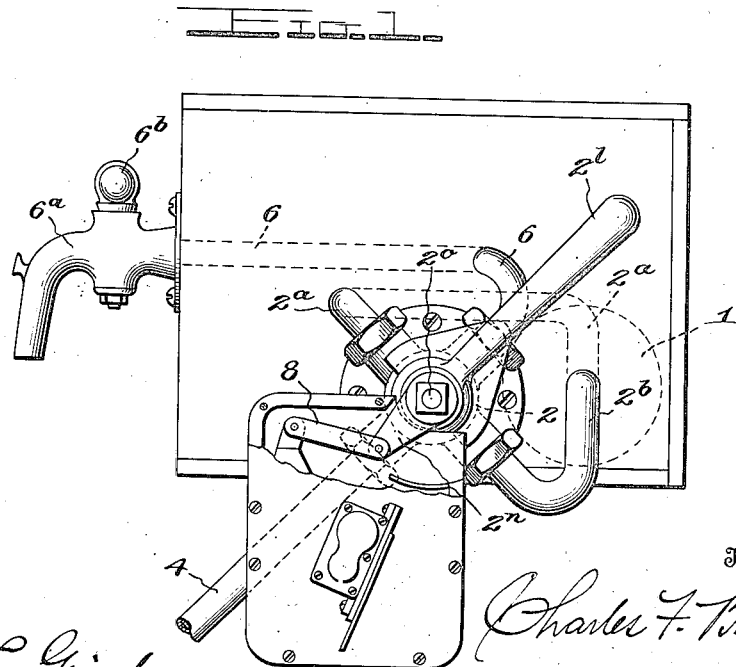

In said drawings:—Figure 1 is an end elevation of a measuring apparatus embodying the invention. Fig. 2 is a diagrammatic sectional view of such apparatus.

The measuring device proper preferably consists of a vessel 1, which is shown as a cylinder closed at both ends by heads $1^a$ and $1^b$; head $1^a$ is provided with a port communicating with a nipple $1^c$, and head $1^b$ with a port communicating with a nipple $1^d$, to which nipples are attached pipes $2^a$, $2^b$, hereinafter referred to. Within this cylinder is fitted a piston $1^e$ which is movable longitudinally of the cylinder and is adapted to be moved by the liquid admitted into the cylinder as hereinafter explained.

The pipes $2^a$ and $2^b$ are respectively connected at their outer ends to ports $2^c$, $2^d$, of a four-way valve casing 2, said ports $2^d$, $2^c$ being preferably diametrically opposite each other. Intermediate the ports $2^c$, $2^d$ are preferably diametrically opposite ports $2^e$, $2^f$; the port $2^e$ communicates with a supply pipe 4, and the port $2^f$ with a dispensing pipe 6, hereinafter referred to.

Within the valve casing 2 is a valve $2^h$ to the stem $2^o$ of which is connected a lever $2^l$ by which the valve can be manually operated. This valve has two transverse ports $2^j$, $2^k$ which are so formed that by turning the valve in one direction communication will be established through the port $2^j$ between the ports $2^c$ and $2^e$; and simultaneously port $2^k$ will establish communication between the ports $2^d$ and $2^f$ as illustrated in full lines in Fig. 4. By turning the valve, ports $2^j$ and $2^k$ can be shifted so that port $2^j$ will establish communication between the ports $2^c$ and $2^f$, and port $2^k$ will establish communication between the ports $2^e$ and $2^d$ as indicated in dotted lines in Fig. 4.

The pipe 4 connects with the liquid supply. Preferably it communicates with a supply valve $4^a$ which may be connected by a pipe $4^b$ to a vessel K containing the liquid to be dispensed. Preferably the valve $4^a$ has two inlet ports so that it can be simultaneously connected by pipes $4^b$, $4^c$ to two vessels K, K', and by properly shifting valve $4^a$ communication can be established alternately between the pipe 4 and either vessel K or K'.

The pipe 6 may be connected to any suitable receiver; and is shown as connected to a dispensing faucet $6^a$ which can be operated manually by a handle $6^b$. All the pipes and parts exposed to contact with the liquid should be made or lined with non-corroding metal.

The stem of valve $2^h$ may be connected to a registering mechanism, indicated at 8, which is shifted at each shift of the valve lever to register the amount of liquid passed through the vessel. Assuming, for example that said vessel can contain but one pint of liquid, the register will record a pint, (or one unit of measure,) each time that the valve lever $2^l$ is shifted to the right or to the left; and for each movement of the valve a pint of liquid is passed into the vessel 1, and a like amount discharged therefrom.

The particular registering mechanism which I prefer to use forms the subject-matter of a companion application Serial No. 807,911 filed December 20, 1913, of which this application is a division, and such registering mechanism needs no detailed description herein.

In practice the measuring vessel 1 is preferably placed within a cooler or ice box so that the liquid contents thereof will be chilled.

The operation of the apparatus is as follows: After the containers K, K' have been connected to the casing of the valve $4^a$, the latter is opened, and assuming the valve to be in the position shown in Fig. 2, when the faucet $6^a$ is opened liquid will flow from the container K through valve $4^a$, pipe 4, port $2^j$, pipe $2^a$ and through the head $1^a$ of the measuring vessel 1, and the liquid will force the piston $1^e$ in said container to the head $1^b$ thereof, and any liquid contained between the piston $1^e$ and the head $1^b$ will be discharged through the pipe $2^b$, port $2^k$, pipe 6 and the faucet $6^a$. When the piston $1^e$ has moved against the head $1^b$ it closes the outlet aperture in said head and no more liquid escape through the faucet, and no more liquid can enter the measuring vessel 1. This vessel is made of such size that it will contain a predetermined quantity of liquid, say one pint or one quart, and the introduction of such a quantity of liquid into the cylinder will force the piston to one end thereof. When no more liquid escapes through the pipe 6, valve $2^h$ may be shifted so as to establish communication between pipes 4 and $2^b$, and between pipes $2^a$ and 6 (as indicated in dotted lines in Fig. 2;) thereupon, when the faucet $6^a$ is opened, liquid will flow from the supply through pipe 4 and $2^b$ into the cylinder 1 through head $1^b$ and force the piston $1^e$ to the left; and liquid will be discharged through the pipes $2^a$ and pipe 6 until the piston reaches the head $1^a$ of the vessel, then no more liquid will escape through pipe 6, when the faucet is open, until the valve $2^h$ is again shifted to the position shown in full lines in Fig. 2. Thus by shifting the valve $2^h$ communication is established alternately between the supply and the opposite ends of the vessel 1, and between the opposite ends of said vessel and the faucet; but at no time can direct communication be established between the supply and the faucet; and the liquid is thus always held under its initial pressure between the supply and the piston $1^e$; and does not have any opportunity to foam until it is discharged from the faucet. Each shifting movement of the valve $2^h$ may be recorded on the register as described, and at any time by inspecting the register the total amount that has been withdrawn can be determined.

It is sometimes desirable to cleanse the pipes and passages through which the fluid passes, by forcing a chemical solution therethrough. The solution could be passed through the apparatus in the same way that the fluid passes; but it is unnecessary to cleanse the measuring vessel frequently for the reason that it is kept clean by the reciprocatory movement of the plunger $1^e$ therein. In order to facilitate cleansing the pipes and valves without running the fluid through the measuring vessel, a by-pass pipe 7 may be connected to and between three-way valves $7^a$, interposed between the pipes $2^a$ and $2^b$ and the nipples $1^c$ and $1^d$ respectively. These valves $7^a$ when in normal position do not communicate with the pipe 7 but establish communication between the pipes $2^a$, $2^b$ and nipples $1^c$, $1^d$ respectively, as shown in Fig. 2. When it is desired to cleanse the circulating pipes without introducing the cleansing solution into the measuring vessel, the valves $7^a$ are turned so as to close communication between pipes $2^a$ and $2^b$ and the cylinder 1; and establish communication between the pipes $2^a$, $2^b$ and pipe 7; then the solution can be circulated through the pipes 4, $2^a$, 7, $2^b$, and 6, and such pipes and valves are quickly and thoroughly cleansed.

What I claim is:

1. In a liquid dispensing apparatus the combination of a measuring vessel provided with openings and an interposed movable member, pipes connected with said vessel, and means for alternately connecting one of said pipes with a liquid supply and the other with a discharge; with a by-pass connecting the said pipes adjacent the vessel, and means for closing communication between said pipes and the vessel intermediate the by-pass and the vessel and establishing communication between said pipes through the by-pass, or cutting out the by-pass pipe and reestablishing communication between said pipes and the measuring vessel.

2. In combination, a measuring vessel, a reciprocating piston therein, a four-way valve casing, pipes connected with opposite ends of the vessel and with said valve casing; a dispensing pipe connected with said valve casing, a supply pipe also connected with said valve casing; and a valve in said casing provided with ports whereby communication may be alternately established through said valve between the supply and either end of the vessel, and simultaneously between the other end of the vessel and the dispensing pipe; with a by-pass pipe connected with the pipes communicating with the vessel at points adjacent the vessel, and valves at the junctions of said by-pass and pipes whereby communication between said pipes and vessel may be closed and communication between said pipes through the by-pass pipe established, or whereby communication between the by-pass and said pipes can be closed and communication established between said pipes and the measuring vessel.

In testimony that I claim the foregoing as my own, I affix my signature in presence of two witnesses.

CHARLES F. BROWN.

Witnesses:
 MABEL T. MYERS,
 B. F. GEARY.